(12) United States Patent
Ineichen

(10) Patent No.: US 11,278,929 B2
(45) Date of Patent: Mar. 22, 2022

(54) DEVICE FOR DISPENSING A FLOWABLE MEDIUM

(71) Applicant: Robatech AG, Muri (CH)

(72) Inventor: Beatus Ineichen, Weggis (CH)

(73) Assignee: ROBATECH AG, Muri (CH)

( * ) Notice: Subject to any disclaimer, the term of this patent is extended or adjusted under 35 U.S.C. 154(b) by 247 days.

(21) Appl. No.: 16/830,725

(22) Filed: Mar. 26, 2020

(65) Prior Publication Data
US 2020/0306789 A1    Oct. 1, 2020

(30) Foreign Application Priority Data
Mar. 29, 2019  (EP) ..................................... 19166092

(51) Int. Cl.
| B05C 11/10 | (2006.01) |
| B05C 5/02 | (2006.01) |
| B29B 13/02 | (2006.01) |

(52) U.S. Cl.
CPC ........ B05C 11/1026 (2013.01); B05C 5/0225 (2013.01); B05C 11/1013 (2013.01); B29B 13/022 (2013.01)

(58) Field of Classification Search
None
See application file for complete search history.

(56) References Cited

U.S. PATENT DOCUMENTS 3,811,405 A * 5/1974 Baker ................. B29C 65/4815
118/675
3,815,788 A * 6/1974 Reighard .............. B29B 13/022
222/146.5

(Continued)

FOREIGN PATENT DOCUMENTS

| DE | 10 2015 000 630 B3 | 2/2016 |
| EP | 2 308 602 A2 | 4/2011 |
| GB | 2 194 822 A | 3/1988 |

OTHER PUBLICATIONS

European Patent Office, European Search Report and Written Opinion, dated Oct. 25, 2019 (Oct. 25, 2019), 5 pages, European Patent Office, Munich, Germany.

*Primary Examiner* — Jethro M. Pence
(74) *Attorney, Agent, or Firm* — Christopher C. Dremann, P.C.; Christopher C. Dremann

(57) ABSTRACT

A device for dispensing a flowable medium, includes a housing having a cavity for receiving the flowable medium, a rod mounted in a bearing section of the housing, wherein the rod is movable by means of an actuator between a first end position and a second end position in an axial direction, a dispensing opening, opening into the cavity, for dispensing the flowable medium, wherein the rod has a sealing section, wherein the sealing section closes the dispensing opening in the first end position and is arranged at a distance from the dispensing opening in the second end position, a bellows seal for sealing off the bearing section from the cavity, wherein the rod passes through the bellows seal, wherein the bellows seal is mounted in a sealed manner on the rod and in a sealed manner on the housing, wherein a first section of the bellows seal is connected to the rod in a manner fixed relative to the rod, and a second section of the bellows seal is connected to the housing in a manner fixed relative to the housing, wherein the bellows seal has at least one compensating section for compensating an axial compression or extension of the bellows seal, wherein the compensating section projects radially relative to adjoining regions of the bellows seal, and having at least one channel, opening into the cavity, through which the flowable medium can flow into the cavity, wherein a projection of a center line of a channel section of the at least one channel, said channel section opening into the cavity, onto a projection plane formed (Continued)

perpendicularly to the axial direction forms a circle tangent of a circle formed concentrically with the rod.

21 Claims, 2 Drawing Sheets

(56) References Cited

U.S. PATENT DOCUMENTS

| | | | | |
|---|---|---|---|---|
| 3,827,603 A * | 8/1974 | Reighard | ............. | B29B 13/022 |
| | | | | 222/146.5 |
| 4,360,132 A * | 11/1982 | Vilagi | ............. | B05B 9/01 |
| | | | | 222/504 |
| 4,565,217 A * | 1/1986 | McIntyre | ............. | B05C 5/0225 |
| | | | | 137/563 |
| 4,798,314 A * | 1/1989 | Worth | ............. | B05C 5/0225 |
| | | | | 222/542 |
| 4,842,162 A * | 6/1989 | Merkel | ............. | B05C 5/0225 |
| | | | | 222/1 |
| 4,852,773 A * | 8/1989 | Standlick | ............. | B05B 1/306 |
| | | | | 222/504 |
| 4,858,789 A * | 8/1989 | Breault | ............. | B05B 1/306 |
| | | | | 222/309 |
| 4,907,741 A * | 3/1990 | McIntyre | ............. | B05B 7/0475 |
| | | | | 239/124 |
| 5,277,400 A * | 1/1994 | Bierther | ............. | B05C 5/001 |
| | | | | 239/585.1 |
| 5,747,102 A * | 5/1998 | Smith | ............. | B05C 5/001 |
| | | | | 427/98.4 |
| 5,971,296 A * | 10/1999 | Fukano | ............. | B05B 1/28 |
| | | | | 222/571 |
| 6,170,759 B1 * | 1/2001 | Meyer | ............. | B05B 7/0861 |
| | | | | 239/298 |
| 6,361,602 B1 * | 3/2002 | Hahn | ............. | B05C 1/06 |
| | | | | 118/264 |
| 6,799,702 B1 * | 10/2004 | Mercer | ............. | B05C 5/0225 |
| | | | | 137/549 |
| 8,616,525 B2 * | 12/2013 | Franz | ............. | F16K 41/12 |
| | | | | 251/331 |
| 2004/0195278 A1 * | 10/2004 | Leeuw | ............. | B05C 11/1034 |
| | | | | 222/504 |
| 2006/0097015 A1 | 5/2006 | Riney | | |
| 2007/0145164 A1 * | 6/2007 | Ahmadi | ............. | B05C 5/0275 |
| | | | | 239/583 |
| 2008/0105703 A1 * | 5/2008 | Prentice | ............. | H01L 21/6715 |
| | | | | 222/63 |
| 2014/0263688 A1 * | 9/2014 | Doyle | ............. | B05C 11/1034 |
| | | | | 239/1 |
| 2015/0041501 A1 * | 2/2015 | Ineichen | ............. | B05B 15/52 |
| | | | | 222/148 |
| 2015/0041502 A1 * | 2/2015 | Ineichen | ............. | B65D 83/28 |
| | | | | 222/148 |
| 2015/0076177 A1 | 3/2015 | Evans, III et al. | | |
| 2015/0251195 A1 * | 9/2015 | Liao | ............. | B05C 5/0225 |
| | | | | 239/584 |
| 2017/0333923 A1 * | 11/2017 | Hattley | ............. | B05C 5/0225 |
| 2019/0376617 A1 * | 12/2019 | Ikushima | ............. | B05B 1/3046 |

* cited by examiner

DEVICE FOR DISPENSING A FLOWABLE MEDIUM

FIELD OF THE INVENTION

The present invention relates to a device for dispensing a flowable medium, wherein the flowable medium is preferably an adhesive, in particular a hot glue or hot melt adhesive.

BACKGROUND OF THE INVENTION AND RELATED ART

Devices for dispensing a flowable medium are used to apply flowable medium in portions to a substrate, for example. In this context, the application of the flowable medium generally takes place in a controlled manner, wherein the device has a dispensing opening for dispensing the flowable medium, wherein this dispensing opening can be closed and opened by means of a sealing section of a rod movable by means of an actuator. To this extent, a device of this kind has a closable valve. A device for dispensing a flowable medium can also be designed as a pressure control valve, pressure relief valve or restrictor. In the case of design as a restrictor, the dispensing opening remains permanently open as operation continues. The embodiment as a pressure control valve or a pressure relief valve to limit a pressure can be a safety element, wherein the dispensing opening is normally closed and very seldom opened to achieve the function of pressure limitation.

In respect of such devices for dispensing a flowable medium of the abovementioned type, one particular problem is that of preventing the flowable medium from entering the region of the actuator or the region of a bearing section of the device for the rod. In order to seal off the actuator and/or the bearing section with respect to the flowable medium, in particular a cavity holding the flowable medium, seals are used, wherein two different types of seal are known in principle for this purpose.

On the one hand, there is a so-called "dynamic seal", wherein, in the case of a dynamic seal, the seal or the sealing element is formed or arranged between two surfaces that move relative to one another during the operation of the device. One disadvantage with this type of sealing is that, in long-term operation of the device, the dynamic seal is worn away and, as a result, the seal loses its sealing effect, and there may be unwanted penetration of flowable medium into the region of the actuator and/or of the bearing section as a consequence. Apart from the inevitable wear, one known disadvantage of dynamic seals is the lack of freedom from leakage. This means that, with each double stroke of the rod, a certain quantity of the flowable medium passes continuously through the sealing region. These are very small quantities, which become greater with increasing wear of the seal. Dynamic seals furthermore have the characteristic that they can stick after a prolonged stoppage. In this case, the stationary flowable medium may stick around the sliding region of the seal and hinder sliding or render it impossible. When using a device of this kind to dispense a flowable medium as a safety element, e.g. as a pressure relief valve, this can lead to failure of the valve, and the safety function would thus not be assured.

On the other hand, so-called "static seals", in particular in the form of bellows seals, are known from the prior art. In contrast to a dynamic seal, sealing does not take place between two surfaces that move relative to one another in the case of a bellows seal; instead, the bellows seal is connected statically by a first section to the rod and statically by a second section to another element of the device, wherein the rod moves relative to the second element of the device. Typically, the second element is a partial region of the housing. The movement of the rod relative to the element of the device is accommodated by a deformation of the bellows seal, wherein, for this purpose, the bellows seal generally has a compensating section for compensating axial compression or extension of the bellows seal. In the case of a folding bellows seal, this compensating section is formed by a fold, for example. In the case of a static seal, particularly in the form of a bellows seal, very high leak tightness is assured even in the case of long-term operation of the device since there are only small friction forces at the seal.

Devices for dispensing a flowable medium, which have a bellows seal for the purpose of sealing, are known from EP 2 308 602 A2, US 2006/0097015 A1 and DE 10 2015 000 630 B3, wherein the latter has features of the present invention. DE 10 2015 000 630 B3 discloses a device for dispensing a flowable medium having:

- a housing having a cavity for receiving the flowable medium,
- a rod mounted in a bearing section of the housing, wherein the rod can be moved by means of an actuator between a first end position and a second end position in an axial direction and vice versa,
- a dispensing opening, opening into the cavity, for dispensing the flowable medium, wherein the rod has a sealing section, wherein the sealing section closes the dispensing opening in the first end position and is arranged at a distance from the dispensing opening in the second end position,
- a bellows seal for sealing off the bearing section from the cavity, wherein the rod passes through the bellows seal, wherein the bellows seal is mounted in a sealed manner on the rod and in a sealed manner on the housing, wherein a first section of the bellows seal is connected to the rod in a manner fixed relative to the rod, and a second section of the bellows seal is connected to the housing in a manner fixed relative to the housing, wherein the bellows seal has at least one compensating section for compensating an axial compression or extension of the bellows seal, wherein the compensating section projects radially relative to adjoining regions of the bellows seal, and
- at least one channel, opening into the cavity, through which the flowable medium can flow into the cavity.

In the case of a device having a bellows seal of the kind known from DE 10 2015 000 630 B3, for example, there is the problem that there are regions in the cavity in which no exchange of the flowable medium or virtually no exchange of the flowable medium takes place, and therefore so-called "dead spaces" form in these regions. With these dead spaces, there is the problem that, owing to the lack of exchange of the flowable medium in this region, the properties of the flowable medium present there, e.g. flow properties or adhesive properties, change, e.g. hot melt adhesive oxidizes and/or ages and, as a result, hardens, or its consistency changes or the flowable medium hardens owing to the introduction of foreign substances. Accordingly, such dead spaces are unwanted and should be avoided. The problem of such dead spaces exists particularly with bellows seals, especially with folding bellows seals, since the compensating section, which is situated in the cavity, hinders the exchange of flowable medium in regions of the cavity owing to its radial extent, and adequate exchange of flowable medium is hindered, especially on a side of the compensating section facing away from the dispensing opening.

OBJECT AND SUMMARY OF THE INVENTION

It is therefore the object of the present invention to further develop a device that has features in such a way that formation of dead spaces in the region of the cavity is avoided.

This object is achieved by a device which has features of the present invention.

To avoid dead spaces in the region of the cavity, it is envisaged that a projection of a center line of a channel section of the at least one channel, said channel section opening into the cavity, onto a projection plane formed perpendicularly to the axial direction forms a circle tangent of a circle formed concentrically with the rod.

By virtue of this configuration of the channel, specifically of the channel section, the flowable medium flowing in through the channel is introduced into the cavity in such a way that the flowable medium flows tangentially into the cavity, thereby avoiding dead spaces of the kind which would occur with radial inflow in the direction of the rod, for example.

Depending on the viscosity and the flow properties of the flowable medium, it is possible, with such a configuration of the channel section, in particular to promote the formation of a rotary flow or swirling flows in the cavity, this in turn having an advantageous effect on the avoidance of dead spaces.

It is regarded as particularly advantageous if the bellows seal is a folding bellows seal and a fold of the folding bellows seal forms the compensating section.

The bellows seal preferably has a plurality of compensating sections arranged spaced axially apart.

The lift, i.e. the axial distance between the first end position and the second end position of the rod, is preferably in a range of from 0.05 mm to 10 mm, in particular in a range of from 0.05 mm to 1 mm. In ranges above 1 mm, a bellows seal with a plurality of axially spaced compensating sections is preferred.

It is quite conceivable and preferred for the device to have a plurality of channels, which open into the cavity and through which the flowable medium can flow into the cavity, wherein a projection of the center line of the channel section of the respective channel, said channel section opening into the cavity, onto the projection plane formed perpendicularly to the axial direction forms a circle tangent of a circle formed concentrically with the rod.

In this context, it is regarded as particularly advantageous if the center line of the channel section, opening into the cavity, of a first channel forms a circle tangent of a first circle, and the center line of the channel section, opening into the cavity, of a second channel forms a circle tangent of a second circle, wherein the two circles are not identical, in particular the two circles have different circle diameters. This in turn has an advantageous effect on the avoidance of dead spaces.

The channel sections of the channels are preferably arranged in the same plane in the axial direction.

It is regarded as advantageous if the channel sections are arranged axially spaced apart, in particular if the device has a plurality of compensating sections arranged axially spaced apart, in particular a plurality of folds axially spaced apart.

In order to enforce a flow over the entire extent of the cavity in the axial direction, or to make the cavity free from dead spaces, it is regarded as advantageous if the device has at least two channels, wherein the channel sections of the channels are spaced apart both in the axial direction and in the radial direction.

However, it is also quite conceivable for the channel sections of the channels to be arranged in the same plane in the axial direction.

It is regarded as particularly advantageous if the channel sections are arranged in a rotationally symmetrical, in particular a radially symmetrical manner.

In a preferred embodiment, it is envisaged that at least a partial region of the channel section or of the respective channel section is formed on a side, facing away from the dispensing opening, of a plane formed by a radially outer region of the compensating section. With such a configuration, exchange of the flowable medium on a side of the compensating section facing away from the dispensing opening is promoted and thus the formation of dead spaces in this region is avoided.

In a particularly preferred embodiment of the invention, it is envisaged that the center line of the channel section or of the respective channel section extends at an angle to the axial direction, wherein an angle enclosed between the center line and the axial direction is preferentially 70° to 110°, preferably 85° to 95°, in particular 90°.

As particularly advantageous as regards particularly favorable inflow and particularly simple manufacture, provision is made for the channel section or the respective channel section to have a circular cross section.

It is furthermore regarded as advantageous if the channel or the respective channel is of rectilinear design.

The bellows seal is preferably held positively and/or non-positively in the rod and/or the housing.

It is regarded as particularly advantageous if the first section of the bellows seal is held with a clamping action in the rod.

In this context, it is regarded as particularly advantageous if the rod has a radial projection, wherein the first section of the bellows seal is held with a clamping action between this radial projection and a clamping element connected to the rod. The clamping element may be capable of being screwed onto the rod, for example. The clamping element can be a sleeve, for example.

It is regarded as particularly advantageous if the first section and/or the second section are/is designed as a bead.

The compensating section preferably has a wall thickness of 0.5 mm to 2 mm, preferably of 0.9 mm to 1.1 mm.

The bellows seal is preferably of rotationally symmetrical design.

It is regarded as particularly advantageous in respect of long-term stability, chemical resistance and the sealing action if the bellows seal comprises a thermoplastic, in particular is composed of a thermoplastic.

Moreover, a thermoplastic typically has a higher temperature stability, and therefore a bellows seal which comprises a thermoplastic or is composed of a thermoplastic is resistant even to flowable media at a relatively high temperature, e.g. above 120° C., in particular a temperature above 185° C., preferably a temperature above 200° C., which are typical processing temperatures of hot melt adhesives. The range from 120° C. to 185° C. is the preferred temperature range for hot melt adhesives. The temperature of the flowable medium can be in the range of from 0° C. to 220° C. The temperature is preferably between 20° C. and 200° C. and particularly preferably between 120° C. and 185° C.

The thermoplastic is preferably MFA (perfluoromethylalkoxy), PFA (perfluoroalkoxy), FEP (fluoroethylenepropylene), PTFE (polytetrafluoroethylene), PEEK (polyether ether ketone), or PI (polyimides).

The use of one of the abovementioned thermoplastics has the advantage over an elastomer material that these thermoplastics are chemically more stable than an elastomer material especially in relation to aromatic hydrocarbons. Moreover, it has been found that a better, in particular more leak tight, non-positive and/or positive joint can be produced with one of the abovementioned thermoplastics than with the conventional elastomer materials. In addition to the abovementioned thermoplastics, however, other thermoplastics are also conceivable, which have a sufficiently high chemical resistance to the flowable medium used.

In an advantageous development of the device, it is envisaged that the circle or the respective circle has a diameter, wherein the cavity has a dimension in the projection plane, wherein a ratio of the diameter of the circle to the dimension is 0.2 to 0.99, preferably 0.2 to 0.95, preferably 0.3 to 0.9, particularly preferably 0.4 to 0.8, in particular 0.5 to 0.7. This promotes the formation of a rotary flow and furthermore ensures sufficient exchange of flowable medium in regions of the cavity which adjoin the rod. In particular, the ratio is greater than 0.7, preferably greater than 0.9.

By virtue of the particularly favorable inflow of the flowable medium through the channel sections or the channel section, it is possible to make the radial extent of the compensating section particularly large in relation to the dimensions of the cavity and nevertheless to avoid the disadvantageous formation of dead spaces, especially in regions of the cavity on the side of the compensating section facing away from the dispensing opening. Since a large radial extent of the compensating section has an advantageous effect on the long-term stability of the bellows seal because the deformation of the bellows seal takes place substantially in this region, it is envisaged in an advantageous development of the device that a radially outer region of the compensating section has an extent, wherein the cavity has a dimension in the plane of this extent, wherein a ratio of the extent to the dimension in a position of the rod in which this ratio is at a maximum is 0.3 to 0.98, preferably 0.3 to 0.95, preferably 0.8 to 0.95, in particular 0.85 to 0.9. The ratio is preferably at a maximum when the rod is in the second end position.

In order to save space, it is advantageous if the ratio is as large as possible. In order to achieve a sufficient volume flow of the flowable medium with a low pressure loss, it is advantageous if the ratio is as small as possible. The abovementioned ratios have proven particularly advantageous as regards a compromise between the two abovementioned criteria.

It is regarded as particularly advantageous if the second section is designed as a flange, wherein the flange is mounted with a clamping action in the housing of the device.

In this context, it is regarded as particularly advantageous if the flange is mounted in the housing with a clamping action by means of a bushing.

The bushing is preferably arranged on a side of the flange facing away from the dispensing opening.

It is regarded as particularly advantageous if the rod passes through the bushing and the bushing thus forms at least a partial region of the bearing section. In this context, it is regarded as advantageous if the bushing has a guiding surface radially on the inside for the axial guidance of the rod.

As regards particularly simple manufacture and assembly of the device, it is envisaged in an advantageous embodiment that the device has a main body section and a head section, wherein the head section is mounted in the main body section.

The head section preferably has the dispensing opening.

The channel or the respective channel is preferably formed in the main body section.

If there are at least two channels, it is regarded as advantageous if the channel sections are of different cross sections and/or at different angles to the axial direction and/or in different axial positions and/or if the circle diameters of the associated circles are different.

It is quite conceivable for channel sections to be formed above and below the compensating section or the respective compensating section in the axial direction.

Each of the channel sections can have different geometric features.

BRIEF DESCRIPTION OF THE DRAWING FIGURES

The invention is illustrated in the following drawing figures by means of an exemplary embodiment without being restricted thereto.

DETAILED DESCRIPTION OF EXEMPLARY EMBODIMENT

Figure 1:
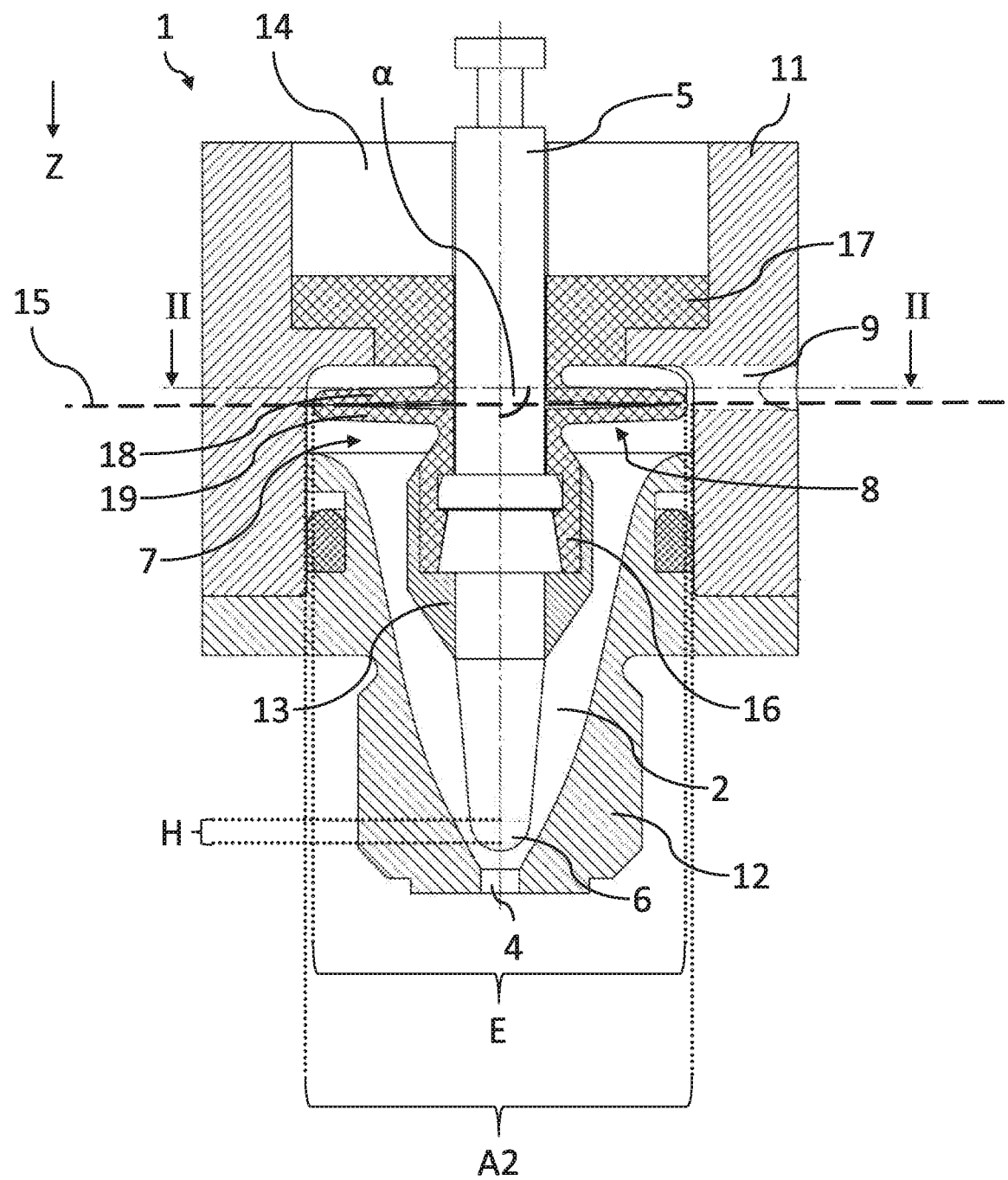
FIG. 1 shows a device for dispensing a flowable medium in section along the line I-I in FIG. 2.
Figure 2:
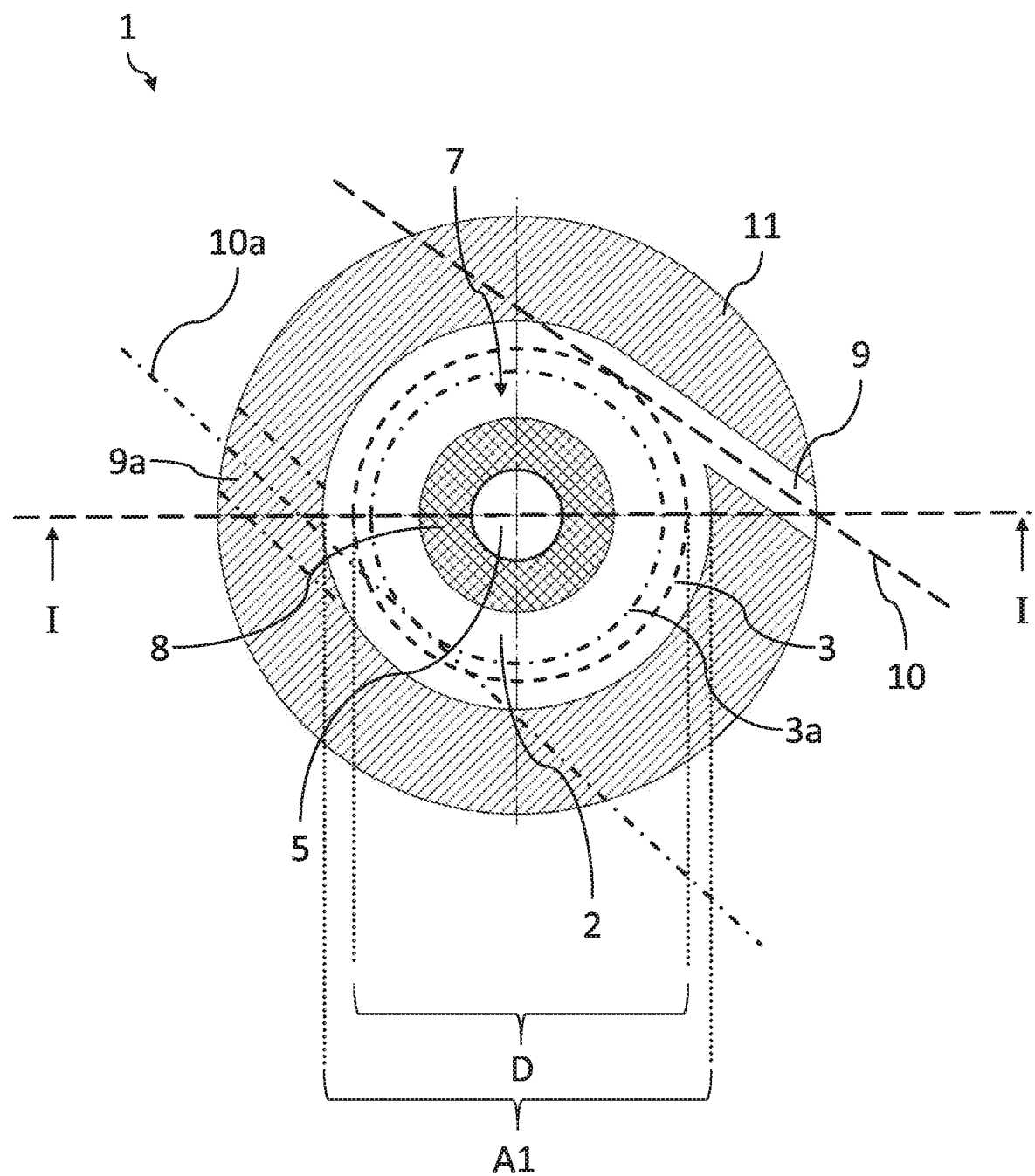
FIG. 2 shows the device in section along the line II-II in FIG. 1.

The device 1 shown in FIG. 1 and FIG. 2 is used to dispense a flowable medium, in the present case to dispense a hot melt adhesive. The device 1 has a head section 12 and a main body section 11, wherein the head section 12 is inserted into the main body section 11 and is connected to the main body section 11.

The device 1 has a cavity 2 for receiving the flowable medium. In the present case, the cavity 2 is formed between the head section 12 and the main body section 11.

The head section 12 has a dispensing opening 4 opening into the cavity 2, wherein the dispensing opening 4 is used to dispense the flowable medium.

In the present case, the head section 12 and the main body section 11 form partial regions of the housing of the device 1.

A rod 5 is mounted in a bearing section 14 of the housing, wherein the rod 5 can be moved by means of an actuator (not illustrated) between a first end position and a second end position in an axial direction Z and vice versa. The rod 5 has a sealing section 6, wherein the sealing section 6 closes the dispensing opening 4 in the first end position and is arranged at a distance from the dispensing opening 4 in the second end position. FIG. 1 shows the rod 5 in the second end position.

The lift H, i.e. the axial distance between the first end position and the second end position of the rod 5, is preferably in a range of from 0.05 mm to 10 mm, in particular in a range of from 0.05 mm to 1 mm.

The actuator can be a pneumatic cylinder, an electromechanical drive or an electropneumatic drive, for example.

The device 1 furthermore has a bellows seal 7 for sealing off the bearing section 14 with respect to the cavity 2, wherein the rod 5 passes through the bellows seal 7. The bellows seal 7 is mounted in a sealed manner on the rod 5 and in a sealed manner on the housing, wherein a first section 16 of the bellows seal 7 is connected to the rod 5 in a manner fixed relative to the rod 5, and wherein a second section 17 of the bellows seal 7 is connected to the housing in a manner fixed relative to the housing.

In respect of the mounting of the first section 16 in the rod 5, the rod 5 has a radial projection, wherein the first section 16 of the bellows seal 7 is held with a clamping action between this radial projection and a clamping element in the form of a ferrule 13 connected to the rod 5, and in this way is connected both positively and non-positively to the rod 5.

The second section 17 of the bellows seal 7 is designed as a flange, wherein the flange is mounted in the housing with a clamping action by means of a bushing, wherein the bushing is arranged on a side of the flange facing away from the dispensing opening 4, wherein the rod 5 passes through the bushing. Radially on the inside, the bushing has guide surfaces for the axial guidance of the rod 5 and thus forms a partial region of the bearing section 14.

By means of this fixed mounting of the bellows seal 7 on the rod 5 and the housing, the bellows seal 7 forms a static seal.

In order to compensate for the movement of the rod 5 relative to the housing, the bellows seal 7 has a compensating section 8 for compensating axial compression or extension of the bellows seal 7 due to the movement of the rod 5. This compensating section 8 projects radially relative to adjoining regions of the bellows seal 7.

In the present case, the bellows seal 7 is designed as a folding bellows seal with just one fold, which has two fold sections 18, 19, wherein this fold forms the compensating section 8.

The device 1, specifically the main body section 11, has a channel, opening into the cavity 2, through which the flowable medium can flow into the cavity 2.

In this case, the channel is configured in such a way that a projection of a center line 10 of a channel section 9 of the channel, said channel section opening into the cavity 2, onto a projection plane formed perpendicularly to the axial direction Z forms a circle tangent of a circle 3 formed concentrically with the rod 5. This can be seen especially in FIG. 2.

It is quite conceivable for the device 1 to have a plurality of channels, which open into the cavity 2 and through which the flowable medium can flow into the cavity 2, wherein a projection of the center line 10, 10a of the channel section 9, 9a of the respective channel, said channel section opening into the cavity 2, onto the projection plane formed perpendicularly to the axial direction Z forms a circle tangent of a circle 3, 3a formed concentrically with the rod 5. For the purpose of illustration, a further channel this kind with a channel section 9a of this kind and the corresponding center line 10a and the corresponding circle 3a is illustrated as a chain-dotted line in FIG. 2.

At least a subregion of the channel section 9 is formed on a side, facing away from the dispensing opening 4, of a plane 15 formed by a radially outer region of the compensating section 8. Inflow of the flowable medium into the region of the cavity 2, which is formed on a side of the compensating section 8 facing away from the dispensing opening 4, is thus promoted.

The center line 10 of the channel section 9 extends at an angle to the axial direction Z, wherein an angle α enclosed between the center line 10 and the radial direction Z is 90° in the present case.

As can be seen from FIG. 1 and FIG. 2, the channel is of rectilinear design in the present case. However, it is also quite conceivable for the channel to be of angled or curved design.

The bellows seal 7 is of rotationally symmetrical design and, in the present case, is composed of a thermoplastic.

The cavity 2 is of rotationally symmetrical configuration relative to an axis passing through the rod 5.

The circle 3 has a diameter D, wherein the cavity 2 has a dimension A1 in the projection plane, wherein a ratio of the diameter D of the circle to the dimension A1 is approximately 0.86 in the present case D/A1≈0.86).

A radially outer region of the compensating section 8 has an extent E, wherein the cavity 2 has a dimension A2 in the plane of this extent E, wherein a ratio of the extent E to the dimension A2 in a position of the rod 5 in which this ratio is at a maximum, in the present case in the second end position, is about 0.96 E/A2≈0.96).

In the present case, dimension A1 is identical with dimension A2.

The device 1 is suitable for a flowable medium in the cavity 2 with a pressure of 0 bar to 120 bar, in particular 80 bar to 120 bar.

The device 1, in particular the bellows seal 7, is furthermore suitable for flowable media in a temperature range of from 0° C. to 220° C.

With the abovementioned device 1, it is furthermore possible to achieve switching frequencies of 0 Hz to 150 Hz.

The device 1 according to the invention has been found to suffer particularly low wear, to require particularly little maintenance and to be particularly durable when a hot melt adhesive is used as the flowable medium.

In addition to use for dispensing a hot melt adhesive, slight structural modifications also enable the device 1 to be used for control purposes. Slight structural modifications enable the device 1 to be used as a pressure control valve or as a restrictor, for example.

When used as a restrictor or as a pressure control valve, the dispensing opening 4 remains permanently open in operation, and thus the rod 5 is outside the first end position. In this case, the axial distance from the first end position is either continuously controlled in order to limit or regulate a pressure, or the distance remains constant for a restrictor function.

The device 1 can also be used to limit a pressure and can thus be a safety element, which is normally closed, the rod 5 thus being in the first end position, and very seldom performs the function of pressure limitation, in which the rod 5 transfers to a position which does not correspond to the first end position.

That which is claimed is:

1. A device for dispensing a flowable medium comprising:
    a housing having a cavity for receiving the flowable medium;
    a rod mounted in a bearing section of the housing, wherein the rod can be moved by means of an actuator between a first end position and a second end position in an axial direction;
    a dispensing opening, opening into the cavity, for dispensing the flowable medium, wherein the rod has a sealing section, wherein the sealing section closes the dispensing opening in the first end position and is arranged at a distance from the dispensing opening in the second end position;
    a bellows seal for sealing off the bearing section from the cavity, wherein the rod passes through the bellows seal, wherein the bellows seal is mounted in a sealed manner on the rod and in a sealed manner on the housing, wherein a first section of the bellows seal is connected to the rod in a manner fixed relative to the rod, and a second section of the bellows seal is connected to the housing in a manner fixed relative to the housing, wherein the bellows seal has at least one compensating section for compensating an axial compression or extension of the bellows seal, wherein the compensating section projects radially relative to adjoining regions of the bellows seal; and at least one channel, opening into the cavity, through which the flowable medium can flow into the cavity; wherein a projection of a center line of a channel section of the at least one channel, said channel section opening into the cavity, onto a projection plane formed perpendicularly to the axial direction forms a circle tangent of a circle formed concentrically with the rod.

2. The device as claimed in claim 1, wherein the bellows seal is a folding bellows seal and a fold of the folding bellows seal forms the compensating section.

3. The device as claimed in claim 1, wherein the device has a plurality of channels, which open into the cavity and through which the flowable medium can flow into the cavity, wherein a projection of the center line of the channel section of the respective channel, said channel section opening into the cavity, onto the projection plane formed perpendicularly to the axial direction forms a circle tangent of a circle formed concentrically with the rod.

4. The device as claimed in claim 1, wherein at least a partial region of the channel section is formed on a side, facing away from the dispensing opening, of a plane formed by a radially outer region of the compensating section.

5. The device as claimed in claim 1, wherein the center line of the channel section extends at an angle to the axial direction, wherein an angle ($\alpha$) enclosed between the center line and the radial direction is 70° to 110°.

6. The device as claimed in claim 1, wherein the channel section has a circular cross section.

7. The device as claimed in claim 1, wherein the channel is of rectilinear design.

8. The device as claimed in claim 1, wherein the bellows seal is of rotationally symmetrical design.

9. The device as claimed in claim 1, wherein the bellows seal comprises a thermoplastic.

10. The device as claimed in claim 1, wherein the circle has a diameter (D), wherein the cavity has a dimension (A1) in the projection plane, wherein a ratio of the diameter (D) of the circle to the dimension (A1) is 0.2 to 0.99.

11. The device as claimed in claim 1, wherein a radially outer region of the compensating section has an extent (E), wherein the cavity has a dimension (A2) in the plane of this extent (E), wherein a ratio of the extent (E) to the dimension (A2) in a position of the rod in which the ratio is at a maximum is 0.3 to 0.98.

12. The device as claimed in claim 1, wherein the first section of the bellows seal is held in the rod with a clamping action.

13. The device as claimed in claim 1, wherein the second section is designed as a flange, wherein the flange is mounted with a clamping action in the housing of the device.

14. The device as claimed in claim 13, wherein the flange is mounted in the housing with a clamping action by means of a bushing.

15. The device as claimed in claim 1, wherein the device has a main body section and a head section, wherein the head section has the dispensing opening, wherein the head section is mounted in the main body section, and wherein the channel is formed in the main body section.

16. The device as claimed in claim 5, wherein the angle ($\alpha$) enclosed between the center line and the radial direction is 85° to 95°.

17. The device as claimed in claim 5, wherein the angle ($\alpha$) enclosed between the center line and the radial direction is 90°.

18. The device as claimed in claim 9, wherein the bellows seal is composed of a thermoplastic.

19. The device as claimed in claim 10, wherein the ratio of the diameter (D) of the circle to the dimension (A1) is 0.5 to 0.7.

20. The device as claimed in claim 11, wherein the ratio of the extent (E) to the dimension (A2) in a position of the rod in which the ratio is at a maximum is 0.85 to 0.9.

21. The device as claimed in claim 1, wherein the flowable medium is a hot melt adhesive.

* * * * *